United States Patent [19]

Daudelin

[11] Patent Number: 4,509,120

[45] Date of Patent: Apr. 2, 1985

[54] VARIABLE CYCLE-TIME MICROCOMPUTER

[75] Inventor: Douglas S. Daudelin, Jackson, N.J.

[73] Assignee: Bell Telephone Laboratories, Inc., Murray Hill, N.J.

[21] Appl. No.: 428,875

[22] Filed: Sep. 30, 1982

[51] Int. Cl.³ .............................................. G06F 1/00
[52] U.S. Cl. .................................................... 364/200
[58] Field of Search ........................ 364/200 MS File

[56] References Cited

U.S. PATENT DOCUMENTS 4,366,535 12/1982 Cedolin et al. ...................... 364/200

OTHER PUBLICATIONS

Williamson, Tom, "Avoid Refresh-Timing Conflicts in UC Memory Expansion," *EDN*, Jan. 20, 1982, pp. 117-121.

*Primary Examiner*—Raulfe B. Zache

[57] ABSTRACT

There is disclosed a microcomputer having access sequence timing tailored to the requirements of a particular user. The device is arranged with a register for holding a parameter corresponding to a desired access cycle of the microcomputer. The register is adapted to receive from a user, either during manufacture, or during the execution of instructions, any desired parameter. Once the parameter is loaded into the register it will serve to control the cycle time of the microcomputer until such time as the parameter is changed by the user. Provision is made for changing the parameter on an instruction-by-instruction basis so that every instruction may have an independent execution time.

14 Claims, 4 Drawing Figures

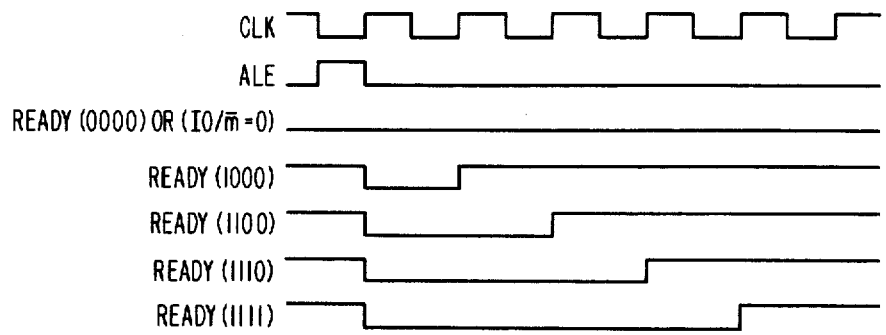
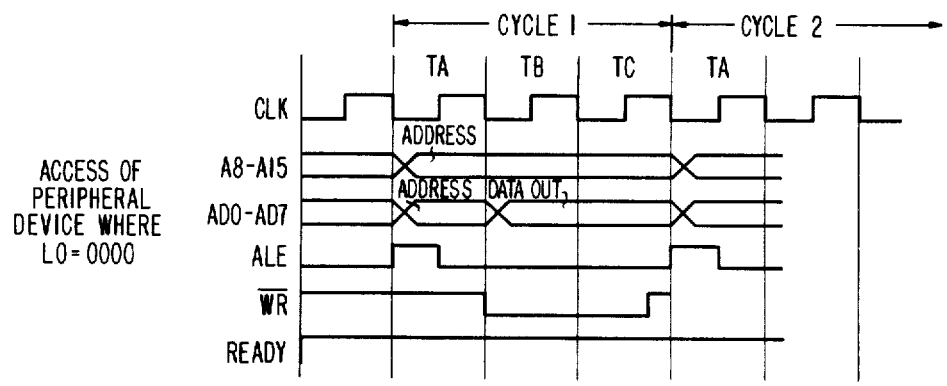
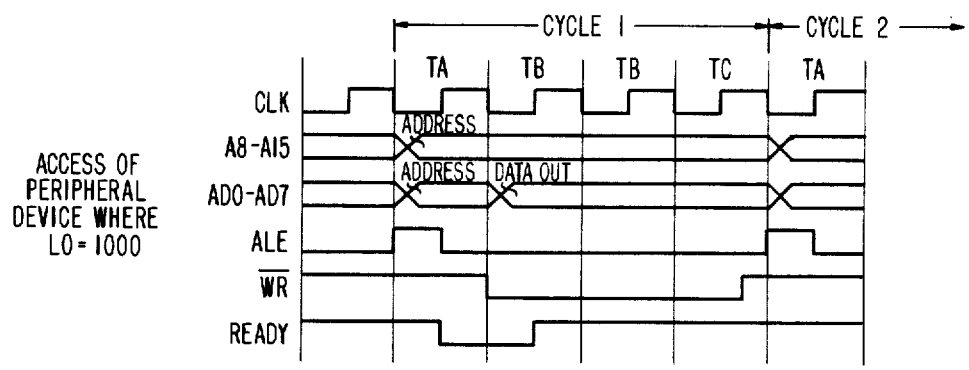

VARIABLE CYCLE-TIME MICROCOMPUTER

BACKGROUND OF THE INVENTION

This invention relates to microcomputers and more particularly to a control circuit for adapting microcomputers to operate with peripheral devices having access times slower than the microcomputer cycle time.

Microcomputers are devices which are designed having a number of input and output leads and the ability to carry out tasks through the execution of user provided instructions. In the context of this application, they may or may not have internal memory. These devices are usually used as the control system for some other complex equipment. Since a single microcomputer will find application in many diverse systems the microcomputer designer must of necessity arrange the device with a vast generality.

An important characteristic of microcomputers is the number of input/output (I/O) leads which link them to the external world. Whatever its task, the microcomputer must input and output data and control signals over these leads. Therefore, the number of these leads, and the way in which they can be used, determines the ease with which the microcomputer can be interfaced to a particular application. Typically, these leads are connected to peripheral devices and many signals must be sequentially communicated between the microcomputer and the devices to perform a particular operation with respect to the peripheral devices. These signals are transmitted during an access cycle of the microcomputer. Problems, however, occur in situations where a peripheral device reacts slower than the cycle time of the processor.

Typical solutions would be to slow or halt the microcomputer; access the peripheral device twice and ignore the first response; access the peripheral device by connecting it to the microcomputer's general purpose I/O leads and generate the sequential actions under program control using several instruction cycles; or use some external circuit for buffering the data to or from the peripheral device. Slowing the microcomputer is contrary to present trends and has impact on all operations, not just on accesses. Some microcomputers do not have halt capability and thus this option is not possible, and in any event requires external circuitry. Some peripherals cannot tolerate double accesses thereby eliminating that possibility. Using the general purpose input/output leads would require external circuitry to supplement those leads since more general purpose leads are necessary to perform an access than are normally available. Adding external circuitry to control access to peripherals is costly and cumbersome.

Thus, a need exists in the art to allow peripheral access by a microcomputer having a nominal cycle time greater than the pre-established accessing instructions.

SUMMARY OF THE INVENTION

A microcomputer is designed having access cycle sequence timing tailored to the requirements of a particular user's peripheral devices through execution of a single instruction. The value contained in an internal hardware register controls the lengthening of the access cycle when a standard access instruction is executed. The user has the ability to load this register during program execution through a special purpose instruction which would load an associated parameter into the register upon execution and affect the action of subsequent access instructions.

In an alternative arrangement, the parameter to be loaded into the register prior to the access could be made a part of the access instruction itself. Two successive accesses, with different cycle times, could then be accomplished without an intermediate register load.

An alternative to making this register user programmable at execution time would be to permanently place a value in it at the factory, as per the user's specifications, at the same time that the internal program memory is being initialized to user specifications.

By gaining the ability to tailor a microcomputer's I/O to the requirements of a particular user, higher performance specifications can be met on nonslowed accesses. In this manner more powerful microcomputers are possible with fewer interface problems.

BRIEF DESCRIPTION OF THE DRAWING

The invention and its several other objects, features and advantages will be more fully understood from a reading of the following description to one embodiment taken in conjunction with the drawing in which:

FIG. 2 is a timing diagram showing the relationship between the clock signals and the control signals;

FIGS. 3 and 4 show charts of the input/output leads during the execution of an access instruction.

DETAILED DESCRIPTION

Figure 1:
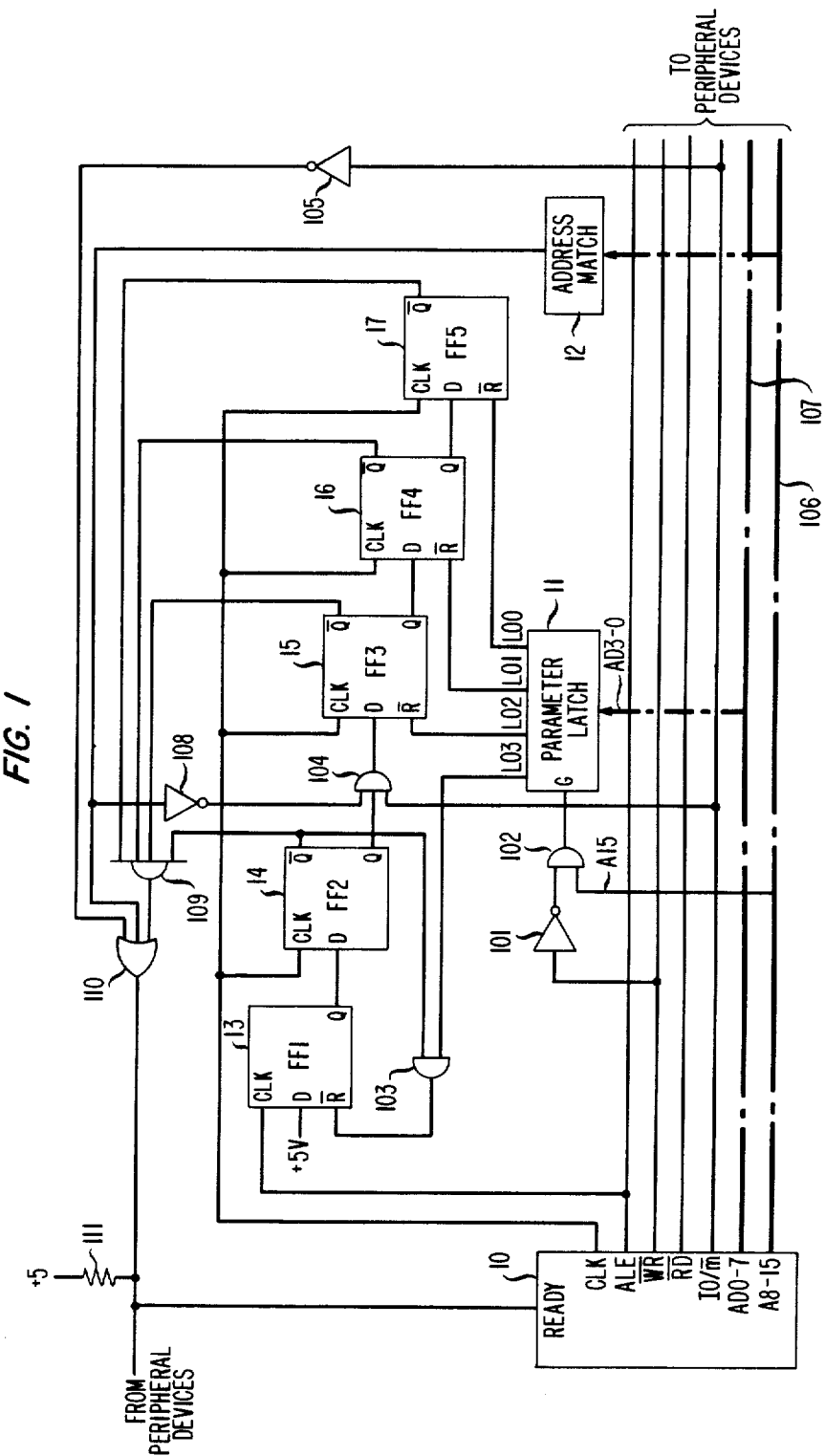
FIG. 1 shows a schematic of a microcomputer with an externally supplied variable timing register.

FIG. 1 shows the electrical connections necessary to perform variable speed accesses with a commercial microcomputer (10), such as the Intel 8085. Leads ADO-AD7 (bus 107) are the lower eight bits of the peripheral device address leads multiplexed with one byte of data. Leads A8-A15 (bus 106) contain the higher eight bits of the peripheral address. Lead $\overline{RD}$ indicates an input cycle and instructs the attached devices that it will receive data on its rising edge. Lead $\overline{WR}$ controls an output cycle and informs the peripheral devices that data is valid on its rising edge.

One implementation of the invention would involve modification of a commercially available microcomputer possessing a ready lead, such as the Intel 8085 microprocessor. However, any other microcomputer or microprocessor could be modified to provide variable access timing control.

I have shown in FIG. 1 the variable timing control circuitry located outside the microcomputer 10 and using the microcomputer's ready lead to control the timing. However, if such a microcomputer were to be designed with my concepts in mind, then the circuitry would be built into the basic structure of the microcomputer. As shown, parameter latch 11, which could be any form of storage device including a RAM or ROM, is adapted to accept on input bus leads ADO-3 of four-bit parameter. The latch in FIG. 1 is loaded by a write cycle to an external peripheral having bit A15 in the address field set. When this latch is placed internal to the microcomputer, it does not have to consume an external address space. The latch could be loaded by an internal register set statement as are many other internal registers such as the stack pointer. As an alternative, it could be loaded automatically with a parameter associated with a particular type of access instruction, the parameter specified by a variable field in the instruction opcode. This parameter is used, as will be seen, to control the access timing portion of each microcomputer cycle.

At the beginning of a cycle, and as shown in FIG. 2, the signal of lead ALE makes a transition thereby toggling flip-flop 13. Clock lead clk then toggles at the microcomputer clock rate and thereby toggles flip-flops 14–17. Until such time as all of the inputs to gate 109 are high that gate remains low keeping the output of gate 110 low thereby keeping a low on the ready lead which in turn blocks microcomputer 10 from sending signals on its address bus. The microcomputer then will remain in a "wait" state until the ready lead goes high which will occur when the count of clock signals on lead clk causes the flip-flops to match the parameter latched in parameter latch 11.

The access timing control exerted by latch 11 can be made conditional on a number of events. In FIG. 1, there are two conditions that must be satisfied concurrently for the control to affect an access. The access must be an I/O access as opposed to an instruction fetch, as evidenced by the signal IO/m, and the address of the accessed device must match a pattern previously loaded into address match circuit 12. This arrangement will allow the user to load a parameter into parameter latch 11 but then allow the microcomputer to use its normal access cycle time for a faster class of peripheral devices without having to reload latch 11 between fast and slow accesses.

In FIG. 2 there is shown a chart having the relative delay times of the ready lead as a function of the parameter loaded in parameter latch 11. Thus, if the bits 0000 were the stored parameter then the ready lead would remain high and the microcomputer would function with the basic timing as shown in FIG. 3, where during subcycle time TA the ALE lead goes high causing address information to be supplied to the address busses. During subcycle TB the write lead WR goes low starting a period in which data on the bus is valid. During subcycle TC the WR lead goes high and information is read from the bus. Since lead READY has remained high throughout this period no delay has been encountered.

Now assume the parameter 1000 has been loaded into register 11 (FIG. 1). Then as shown in FIG. 2, the ready lead would go low for one clock cycle. The result of this low on lead READY is seen in FIG. 4 where subcycle TB is stretched out, encompassing two clock cycles as opposed to the one clock cycle in the previous example. Thus, the write signal on lead WR remains longer, giving more time for the validation of data on the bus.

Using this arrangement then a user may tailor the access time to a particular peripheral or to all peripherals, or even for other internal operations. The designer of the microcomputer then could design the nominal instruction cycle time as fast as desired since the user can easily adjust the cycle time to the particular executing instruction.

CONCLUSION

While this embodiment envisions the user supplying the parameter during the operation of the microcomputer, it is certainly possible to place the value in the microcomputer during manufacture either on a permanent or semi-permanent manner. This arrangement can be used in conjunction with fast and slow devices as shown in my concurrently filed patent application, Ser. No. 428,874, which is hereby incorporated by reference herein.

While the invention has been shown using external hardware relying on the READY lead to modify the access instruction cycle time it is understood that the major value of this concept will be achieved if the microcomputer or microprocessor has the parameter register and control circuitry as a basic part of its internal design. In this manner the user could control all phases of the instruction cycle and not merely rely on the READY lead or other external control lead for control purposes. Thus, this concept can be used with microcomputers not having READY or HALT leads.

What is claimed is:

1. A microcomputer operable under program instruction control for communicating over peripheral access leads with a plurality of peripheral devices, said microcomputer including
    means for controlling said communication during a single access instruction cycle of said microcomputer,
    means for storing a value representative of a desired access instruction cycle time, and
    means for modifying said single access instruction cycle time in accordance with said stored value.

2. The invention set forth in claim 1 wherein said storage means is a register for receiving said value over said peripheral access leads.

3. The invention set forth in claim 1 wherein said storage means is a ROM for permanently storing said value.

4. The invention set forth in claim 1 wherein said storage means includes means for accepting said value during a microcomputer access cycle.

5. The invention set forth in claim 1 further comprising means for selectively inhibiting said modifying means.

6. A microcomputer operable for controlling information flow over input/output leads in response to executed instructions supplied to said microcomputer, said instruction execution being timed in accordance with an internal microcomputer clock cycle, said microcomputer comprising
    means for storing a parameter representative of a desired clock cycle, and
    means for modifying said instruction execution time in accordance with parameters stored in said storage means.

7. The invention set forth in claim 6 wherein said storage means includes
    means for receiving said parameter over said input/output leads from an external source.

8. The invention set forth in claim 6 further comprising means for selectively inhibiting said instruction execution time modifying means on an instruction by instruction basis.

9. The invention set forth in claim 6 wherein said storage means is a ROM adapted to receive said parameter on a permanent basis.

10. The invention set forth in claim 6 wherein said storage means includes means for accepting said parameter during microcomputer instruction execution.

11. A circuit for use with a microcomputer, said microcomputer operable under program instruction control for communicating over peripheral access leads with a plurality of peripheral devices, said circuit including
    means for controlling said communication during a single access instruction cycle of said microcomputer, means for storing a value representative of a desired access instruction cycle time, and means for modifying said single access instruction cycle time in accordance with said stored value.

12. The invention set forth in claim 11 wherein said storage means is a register for receiving said value over said peripheral address leads.

13. The invention set forth in claim 11 wherein said storage means to accepts said value during a microcomputer access cycle.

14. The invention set forth in claim 11 further comprising means for selectively inhibiting said modifying means.

* * * * *